(12) United States Patent
Yoshida (10) Patent No.: US 10,475,202 B2
(45) Date of Patent: Nov. 12, 2019

(54) IMAGE MEASURING DEVICE AND PROGRAM

(71) Applicant: MITUTOYO CORPORATION, Kanagawa (JP)

(72) Inventor: Hiroyuki Yoshida, Kawasaki (JP)

(73) Assignee: MITUTOYO CORPORATION, Kanagawa (JP)

(*) Notice: Subject to any disclaimer, the term of this patent is extended or adjusted under 35 U.S.C. 154(b) by 146 days.

(21) Appl. No.: 15/423,941

(22) Filed: Feb. 3, 2017

(65) Prior Publication Data
US 2017/0228884 A1   Aug. 10, 2017

(30) Foreign Application Priority Data
Feb. 5, 2016 (JP) .................. 2016-021306

(51) Int. Cl.
G06T 7/62        (2017.01)
G06T 7/70        (2017.01)
H04N 5/225       (2006.01)
H04N 5/262       (2006.01)

(52) U.S. Cl.
CPC .................. G06T 7/62 (2017.01); G06T 7/70 (2017.01); H04N 5/225 (2013.01); H04N 5/2256 (2013.01); H04N 5/2624 (2013.01); G06T 2207/20221 (2013.01); G06T 2207/30164 (2013.01)

(58) Field of Classification Search
None
See application file for complete search history.

(56) References Cited

U.S. PATENT DOCUMENTS

| 6,301,956 B1* | 10/2001 | Fujita | ................. G01N 3/42 73/78 |
| 2005/0147287 A1* | 7/2005 | Sakai | ................. G01N 21/9501 382/141 |
| 2005/0196059 A1* | 9/2005 | Inoue | ................. G01N 21/9501 382/240 |
| 2007/0268484 A1* | 11/2007 | Matsui | ................. G01N 21/47 356/237.3 |

(Continued)

FOREIGN PATENT DOCUMENTS

| JP | 2011-185888 A | 9/2011 |
| JP | 2003185547 | * 12/2011 |

*Primary Examiner* — Andrae S Allison
(74) *Attorney, Agent, or Firm* — Greenblum & Bernstein, P.L.C.

(57) ABSTRACT

An image measuring device includes an image capturer capturing an image of a work piece, a displacer relatively displacing the work piece and the image capturer, a position acquirer obtaining a position where the image is captured by the image capturer, a controller controlling the image capturer to capture partial images of the work piece while displacing the image capturer relative to the work piece at a fixed speed using the displacer, a total image former forming a total image of the work piece by pasting together a plurality of partial images captured by the image capturer based on position data obtained by the position acquirer, and a light source integrally displacing with the image capturer relative to the work piece and emitting light at a portion of the work piece captured by the image capturer.

17 Claims, 7 Drawing Sheets

(56) References Cited

U.S. PATENT DOCUMENTS

| | | | |
|---|---|---|---|
| 2009/0109285 A1* | 4/2009 | Tobiason | G02B 21/06 348/79 |
| 2011/0221894 A1* | 9/2011 | Kurihara | G01B 11/005 348/142 |
| 2013/0215263 A1* | 8/2013 | Ariga | G06T 3/4038 348/135 |
| 2014/0333762 A1* | 11/2014 | Yoshida | H04N 5/23212 348/135 |
| 2016/0125583 A1* | 5/2016 | Amanullah | G06T 7/001 348/87 |

* cited by examiner

RELATED ART

IMAGE MEASURING DEVICE AND PROGRAM

CROSS-REFERENCE TO RELATED APPLICATIONS

The present application claims priority under 35 U.S.C. § 119 of Japanese Application No. 2016-021306, filed on Feb. 5, 2016, the disclosure of which is expressly incorporated by reference herein in its entirety.

BACKGROUND OF THE INVENTION

1. Field of the Invention

The present invention relates to an image measuring device and a program measuring a shape of a measurable object without contact, based on an image obtained by capturing the image of the measured object.

2. Description of Related Art

The image measuring device is a device capturing an image of a measured object (hereafter referred to as a "work piece"); analyzing the image; extracting a shape such as a straight line, circle, polygon and the like; and obtaining measurement results such as distance, inclination, diameter, width, and the like of the extracted shape.

The work piece comes in various sizes and when measuring a work piece which fails to fit in an image field of view in a single image capture, a field of view expansion method (referred to as "image stitching") is generally used. The image stitching method captures a plurality of partial images covering an entire work piece and creates a single, total image by pasting together the plurality of partial images (See Japanese Patent Laid-open Publication No. 2011-185888).

Figure 7A:
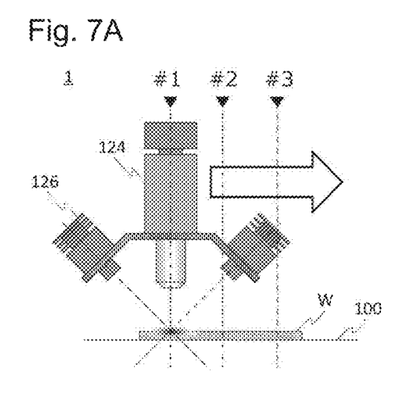
FIGS. 7A to 7C are drawings describing a conventional image stitching method.

FIG. 7A is a schematic view of an image measuring device performing image stitching. The image measuring device includes a stage 100 on which a work piece W is placed; an image capturer 124 (an area sensor) having an image capture region and capturing an image of the work piece W; a displacer relatively displacing the stage 100 and the image capturer 124; a controller capturing a plurality of partial images with the image capturer 124 while displacing the image capturer 124 to the work piece W at a fixed speed with the displacer; a position acquirer obtaining a position where the image capturer 124 captures the image; a total image former forming the total image by pasting together the plurality of partial images based on the position data obtained by the position acquirer; and a light source 126 integrally displacing with the image capturer 124 and emitting light at a portion of the work piece W captured by the image capturer 124.

As a conventional image stitching method, the two methods described below are known, for example. Both methods have in common that the entire work piece is divided into a plurality of regions in a matrix and an image of each region is captured, after which the total image of the work piece is formed by pasting together the plurality of obtained partial images.

Figure 7B:
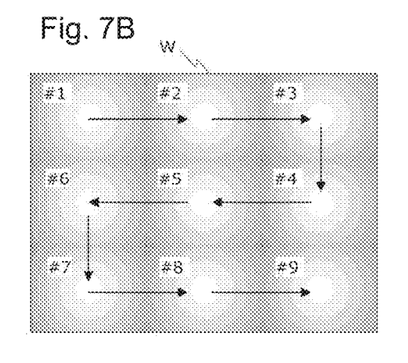

A first method repeats a sequence of relative displacement of the image capturer 124→a pause→capture image of the work piece W→relative displacement. In other words, the image capturer 124 is displaced to a first region #1 of the work piece W, then is paused, and captures the image. Next, the image capturer 124 is displaced to a subsequent region #2 of the work piece W, then is paused, and captures the image. By repeating the sequence in regions #3, #4, #5, and so on, respective partial images for a plurality of regions configuring the entire work piece W are obtained. By pasting together each of the captured partial images based on the respective position data, pixel size and the like, a single total image is formed. The position data for each of the partial images is obtained as a position coordinate of the stage 100 and the image capturer 124 every time the stage 100 is paused. In the first method, for example, exposure time of the image capturer 124 is set at $\frac{1}{12}$ seconds and ROI (Region Of Interest) is set at full pixel reading (such as 2048×1536). FIG. 7B is an exemplary case where nine regions (3×3) of the work piece W captured by the image capturer 124 are sequentially captured using the first method and are pasted together.

Figure 7C:
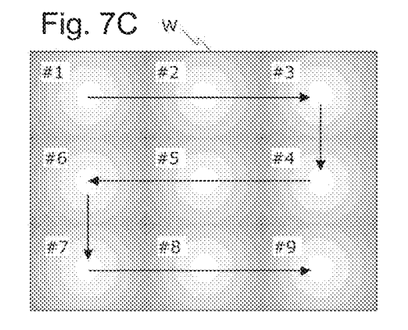

A second method successively captures images of the work piece W when passing each of the regions while displacing the image capturer 124 relative to the work piece W. In other words, while displacing the image capturer 124 at the fixed speed, the image capturer 124 captures the image using an extremely short exposure time from a strobe light, for example, when passing each of the regions and obtains respective partial images of the plurality of regions configuring the entire work piece W. Capturing images while displacing is performed for each region in the same row, and is paused at a region (at both ends of a row) where the image capturer 124 transfers to a second row, then resumes. FIG. 7C is an exemplary case where the nine regions (3×3) of the work piece W captured by the image capturer 124 are sequentially captured using the second method and are pasted together. In this case, after capturing the image of the region #1, the image capturer 124 starts displacing. When transiting the region #2, the image capturer 124 captures the image of the region #2, stops displacement in the region #3, and captures the image of the region #3. When image capture of the first row ends in this way, the image capturer 124 is displaced to the region #4, which is adjacent to the region #3 in the second row. Similar to the first row, image capture is performed respectively from the region #4 to the region #6 in the second row. When capturing images in the first and second rows ends in this way, the image capturer 124 is displaced to the region #7, which is adjacent to the region #6 in a third row. Similar to the first and second rows, image capture is performed sequentially from the region #7 to the region #9 in the third row. Each of the captured partial images is pasted together in the same way as the first method to form a single total image. The position data of respective partial images is obtained as the position coordinates of the stage 100 and the image capturer 124 at the time of a trigger that is output every time an image is captured using the image capturer 124. In the second method, image capture is performed while displacing, and therefore, the exposure time of the image capturer 124 is set short, such as $\frac{1}{300}$ to $\frac{1}{600}$ seconds. On the other hand, ROI of the image capturer 124 is set with the full pixel reading similar to the first method (such as 2048×1536).

In the first method described above in the background art, capturing images may take an excessive amount of time compared to a case where there is no acceleration/deceleration or pausing. In addition, pasting accuracy may be reduced when a device behavior becomes unstable. The second method requires an expensive strobe light capable of emitting high intensity light momentarily on an area having a certain breadth, and therefore an extra cost for the device is incurred. Further, both methods form the single total image by pasting together a plurality of partial images in the matrix of the total image, however, as shown in FIGS. 7B and 7C, brightness of each partial image may be non-uniform at an image center portion close to a center of illumination and an image peripheral portion far from the center of illumination. In addition, due to distortion of a lens, borders and offset may occur where the partial images are pasted together. Therefore, two-dimensional captured images need to be corrected and then pasted together; however, correction errors tend to occur during that time. In addition, when each of the partial images is pasted together, an overlap margin to allow adjusting between adjacent images is required on four sides of the image and therefore, image capture efficiency is not good because a total image area is increased.

SUMMARY OF THE INVENTION

The present invention provides an image measuring device and a program capable of image stitching with high accuracy and high speed without an increase in cost.

(1) The image measuring device of the present invention includes an image capturer capturing an image of a measured object, a displacer displacing the measured object and the image capturer relatively, a position acquirer obtaining a position where the image is captured by the image capturer, a controller controlling the image capturer to capture partial images of the measured object while displacing the image capturer relative to the measured object at a fixed speed using the displacer, a total image former forming a total image of the measured object by pasting together a plurality of partial images captured by the image capturer based on position data obtained by the position acquirer, and a light source integrally displacing with the image capturer relative to the measured object and emitting light at a portion of the measured object captured by the image capturer. The image capturer is set so as to capture an image of only a linear region which is a portion of an image capture region, and a short direction of the linear region matches a relative displacement direction between the measured object and the image capturer, and the controller controls the image capturer to capture sequentially without gaps a plurality of partial images of the measured object.

By setting the image capture region of an area sensor as a line sensor in this way, a frame rate of image capture can be increased and allows capturing a large number of images. In addition, the image capture region is a narrow line and therefore, non-uniform brightness and distortion of a lens are unlikely to occur in the short direction of the captured partial linear image. Therefore, by capturing a plurality of the partial linear images without sequential gaps while displacing the image capturer relative to the measured object, the image capturer having the image capture region set as the line sensor, and pasting together the plurality of partial linear images, an image can be obtained without a border or offset in a direction along which the image capturer is displaced. Accordingly, when the plurality of partial images are pasted together in a conventional image capture method, a lattice pattern has been generated by the border and offset caused by the non-uniform brightness and the lens distortion of the respective partial images. Such an image, which would have a lattice pattern using the conventional method, can be limited to generating stripe-like borders and offset, and therefore, image stitching can be performed with a high degree of accuracy as compared to the conventional image capture method. In addition, image capture is performed while displacing the image capturer, and therefore image capturing time can be shortened and pasting accuracy can be prevented from decreasing due to the device behavior being unstable. Furthermore, a light source is sufficient that is capable of emitting enough light at a portion of the measured object where the linear region is captured by the image capturer and the cost of the device can be reduced because a device capable of illuminating a broad area is not required.

(2) When the image stitching is not necessary, setting the image capture region of the image capturer may be configured to be switchable between a linear portion and a total region since there are cases where capturing images without narrowing down the image capture region may be more efficient.

(3) The image capturer outputs the partial captured image with an index indicating image capture order and outputs a trigger signal when image capture is completed. The position acquirer includes an encoder and a latch portion. The encoder measures and outputs the position coordinates of the stage where the measured object is placed and/or of the image capturer. The latch portion obtains the position coordinates outputted by the encoder when the trigger signal is input and stores in a memory region the obtained position coordinates with a count value indicating image capture order. The total image former may identify the position of respective partial images to form the total image by associating the partial image and the position coordinates having the same image capture order.

Data of the partial image and the image capture position coordinates of the partial image data are individually obtained before forming the total image; however, the image data has the index indicating the image capture order and the position coordinates also have the count value indicating the image capture order. Therefore, both can be associated with each other, even when obtained asynchronously, using the respectively assigned image capture order. Therefore, an error factor from an uncertain delay in at least one of the image capture orders can be eliminated.

(4) A relative displacement speed between the measured object and the image capturer may be changeable using the controller. Measurement can be performed quickly by increasing the displacement speed; however, time of exposure toward the image capture position is decreased and so is the measurement accuracy. The displacement speed corresponding to the required accuracy can be selected by making the displacement speed changeable.

(5) Because the exposure time changes based on the displacement speed, the controller may adjust light intensity of the light source based on the displacement speed. For example, when the displacement speed is fast and the exposure time is short, the light intensity is increased whereas when the displacement speed is slow and the exposure time is long, the light intensity is decreased. Thus, regardless of the displacement speed, the light intensity suitable for the measurement can be emitted at the measured object.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
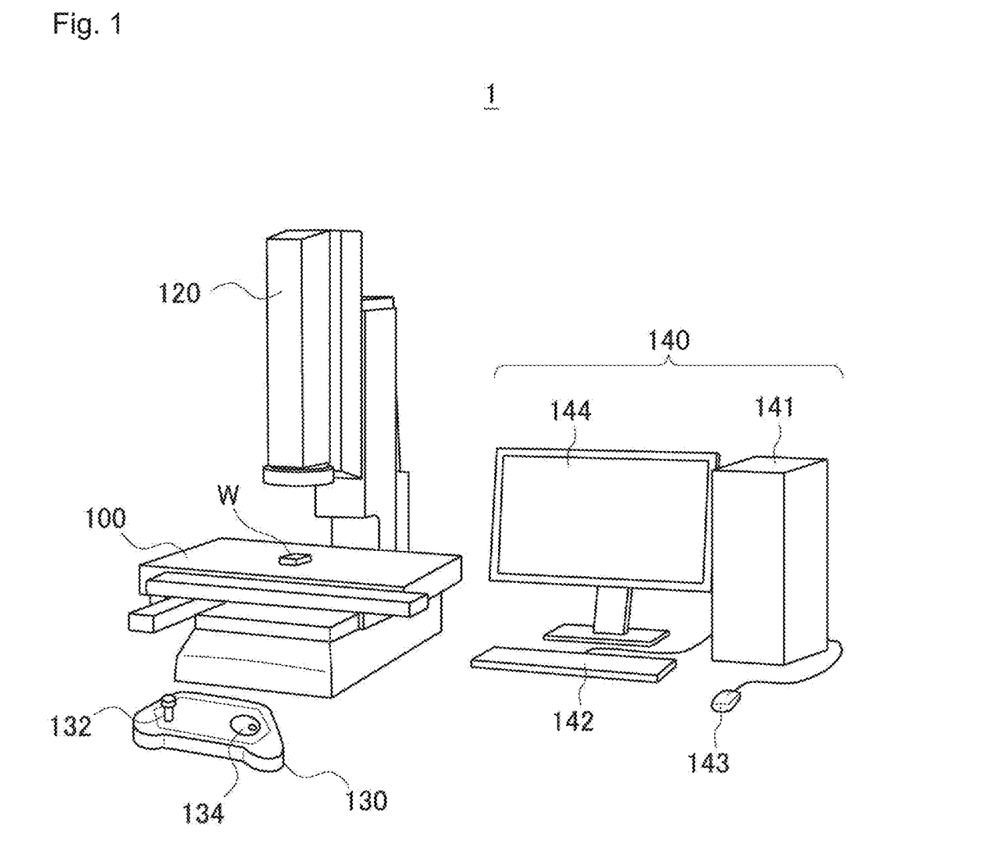
FIG. 1 is a perspective view illustrating a configuration of an image measuring device.

Hereafter, an embodiment of the present invention is described with reference to the drawings. FIG. 1 is a perspective view illustrating a configuration of an image measuring device 1. The image measuring device 1 includes a stage 100, a position acquirer 110, an image capture unit 120, a remote box 130, and a computer system 140.

The stage 100 is arranged such that a top surface of the stage 100 aligns with a horizontal plane, and a work piece W (measured object) is placed on the top surface of the stage 100. At least a portion of the top surface of the stage 100 where the work piece W is placed is formed with a material such as a glass in which light is allowed to pass. The stage 100 is driven by an X axis drive motor and a Y axis drive motor (not shown in drawings) and can be displaced in an X axis direction and a Y axis direction parallel to the horizontal plane. A drive control signal for the drive motor of each axis is given to the respective drive motor of each axis from the remote box 130 and the computer system 140 described later.

Figure 2:
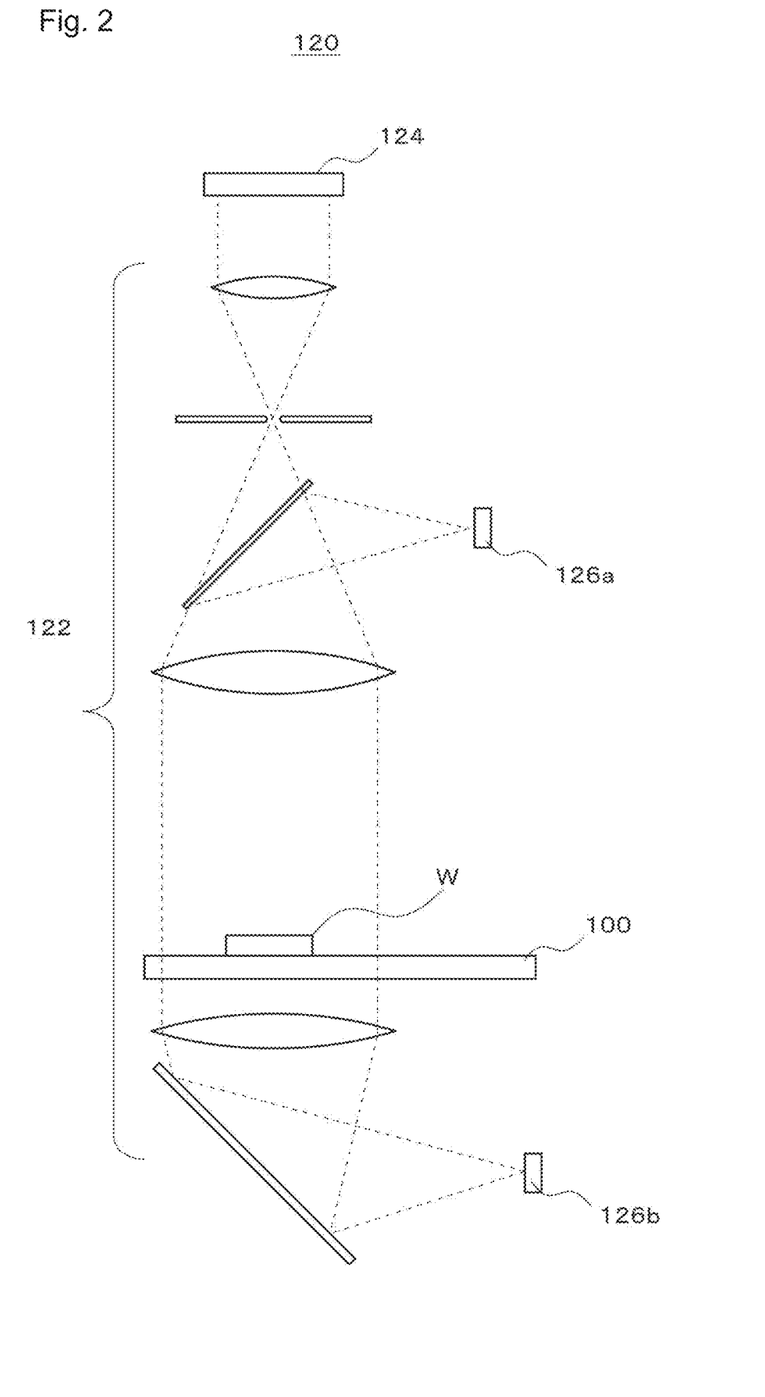
FIG. 2 is a schematic view illustrating a configuration of an image capture unit together with a stage.

FIG. 2 is a schematic view illustrating a configuration of the image capture unit 120 together with the stage 100. The image capture unit 120 includes an optical system 122, an image capturer 124, and a light source 126. The optical system 122 configures a telecentric optical system by combining a plurality of lenses and diaphragms, for example. In the telecentric optical system, a principal ray is considered as parallel light and therefore, a dimension inside a captured image does not rely on a position in a Z axis direction (height direction). Therefore, the telecentric optical system is preferable for measurement of the work piece W having unevenness (such as a step or a hole). The light source 126 emits light at at least a portion of the work piece W where the image is captured subject to control from the computer system 140 when the image of the work piece W is captured. In the present embodiment, the light source 126 includes a light source 126a for epi-illumination emitting light from above (image capturer 124 side) at the work piece W via the optical system 122 and a light source 126b for transillumination emitting light from below (reverse side of the stage 100) at the work piece W. The image capturer 124 is an area sensor capable of ROI setting and may be a two-dimensional image sensor such as CCD, CMOS, and the like. In an image capture region on a photoreception surface of the image capturer 124, an image of the work piece W is formed by the optical system 122. The image capturer 124 captures the formed image and outputs image data in a predetermined format. In the image data, besides information on pixels configuring the image, at least an index indicating an image capture order is included. The image capture unit 120 transmits the image signal output by the image capturer 124 to the computer system 140. The computer system 140 and the image capture unit 120 are connected via a general communication standard such as a USB (Universal Serial Bus), for example. In addition, the image capture unit 120 outputs a trigger signal to a latch portion 118 when capture of a single image (one frame) ends.

The image capture unit 120 can be displaced in the Z axis direction (direction perpendicular to the top surface of the stage 100) driven by a Z axis drive motor (not shown in the drawings). By adjusting the position in the Z axis direction of the image capture unit 120, a focus adjustment is performed. The drive control signal to the Z axis drive motor is given by the remote box 130 and the computer system 140 described later. Alternatively, the Z axis drive motor may be omitted so that the focus adjustment may be performed manually.

Figure 3:
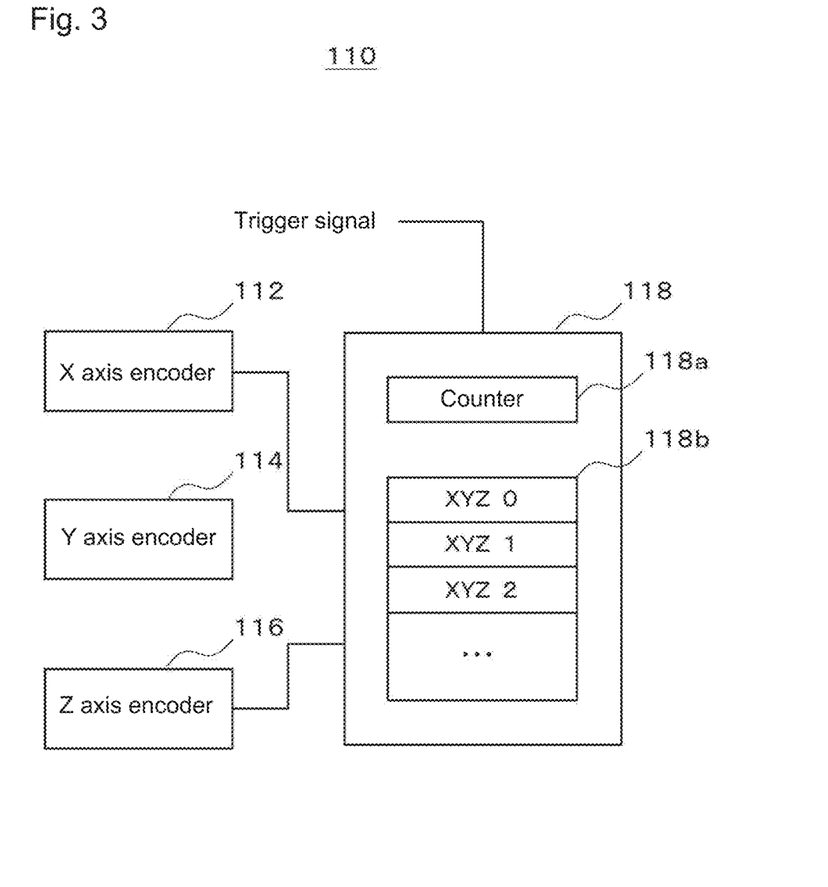
FIG. 3 is a block diagram illustrating a configuration of a position acquirer.

FIG. 3 is a block diagram illustrating a configuration of the position acquirer 110. The position acquirer 110 includes an X axis encoder 112, a Y axis encoder 114, a Z axis encoder 116, and the latch portion 118.

The X axis encoder 112 measures and outputs the position coordinates of the stage 100 in the X axis direction. The Y axis encoder 114 measures and outputs the position coordinates of the stage 100 in the Y axis direction. The Z axis encoder 116 measures and outputs the position coordinates of the image capture unit 120 in the Z axis direction. Each encoder includes a scale carved with scale marks and a scale reader reading the scale marks of the scale. The scale is attached to a movable portion of the stage 100 and the image capture unit 120 along each axis. On the other hand, the scale reader is arranged in a non-movable portion.

The latch portion 118 includes a counter 118a and a buffer 118b. The counter 118a increases a count value by one when the trigger signal (such as a pulse signal) is provided from an exterior. The value of the counter 118a is reset appropriately based on an instruction from the computer system 140. The buffer 118b includes a plurality of memory regions for addresses, and latches and stores an output value of each axis encoder in the memory region of the address corresponding to the count value of the counter 118a at a point in time when the trigger signal is provided. The trigger signal may be provided when image capture of a single image by the image capturer 124 ends, for example. The position coordinates of each axis held by the latch portion 118 are associated with an address value (count value) and are properly imported to the computer system 140. The computer system 140 and the latch portion 118 are connected via the general communication standard such as USB (Universal Serial Bus), for example. The image data and the position coordinates are each individually imported to the computer system 140, but the image data has the index indicating the image capture order and the position coordinates also have the count value indicating the image capture order. Therefore, even though the image data and the position coordinates are imported to the computer system 140 asynchronously, it is possible to associate them with each other after the import by resetting the count value before starting the image capture.

Returning to FIG. 1, the remote box 130 is a manipulator setting the position of the stage 100 and the image capture unit 120, and in response to an operation performed by an operator, the remote box 130 transmits the drive control signal to the X axis drive motor, Y axis drive motor, and Z axis drive motor through a wired or wireless communication. The remote box 130 includes a joystick 132 and a jog shuttle 134. The joystick 132 is an operation inputter setting the position of the stage 100 and the remote box 130, in response to a tilt direction of the joystick 132, transmits the drive control signal in order to displace the stage 100 in the X axis direction and the Y axis direction. The jog shuttle 134 is an operation inputter setting the position in the Z axis direction of the image capture unit 120 and, in response to a rotation direction, rotation amount, rotation speed, and the like of the jog shuttle 134, the remote box 130 transmits the drive control signal in order to displace the image capture unit 120 in the Z axis direction.

Figure 4:
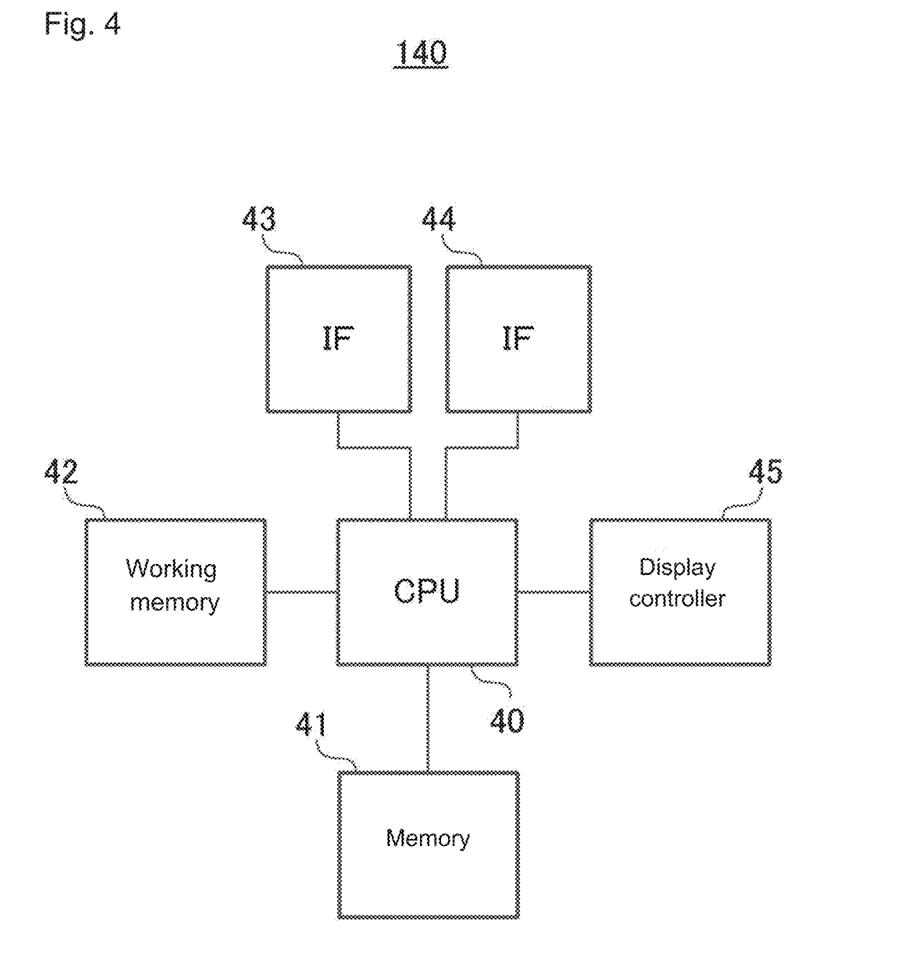
FIG. 4 is a block diagram illustrating a configuration of a computer main body.

The computer system 140 includes a computer main body 141, a keyboard 142, a mouse 143, and a display 144. FIG. 4 is a block diagram illustrating a configuration of the computer main body 141. The computer main body 141 includes a CPU 40 which is a control center, a memory 41, a working memory 42, interfaces 43 and 44 (shown as "IF" in FIG. 4), and a display controller 45 controlling display in the display 144.

The operator's command input using the keyboard 142 or the mouse 143 is input to the CPU 40 via the interface 43. The interface 44 is connected to the image capture unit 120 and the stage 100, and provides various control signals from the CPU 40 to the image capture unit 120 and the stage 100, and receives various kinds of status information and measurement results from the image capture unit 120 and the stage 100 and inputs the information to the CPU 40.

The display controller 45 displays the image captured by the image capture unit 120 in the display 144. In addition, besides the image captured by the image capture unit 120, the display controller 45 displays in the display 144 the interface to enter a control command to the image measuring device 1, a tool interface to analyze the captured image, and the like.

The working memory 42 provides a work region for various processes of the CPU 40. The memory 41 is configured with a hard disk drive, RAM, or the like for example, and stores a program executed by the CPU 40, the image data captured with the image capture unit 120, and the like.

Based on the various information input via the respective interfaces, the operator's command, a measurement definition program (parts program) stored in the memory 41, and the like, the CPU 40 controls the image capture unit 120, the X axis drive motor, Y axis drive motor, Z axis drive motor, and the like, and executes various processes such as the adjustment of the displacement speed and the exposure time of the image capture unit 120, the ROI setting of the image capture region of the image capturer 124, the adjustment of the light intensity of the light source 126, image capture of the two-dimensional image by the image capture unit 120, an image stitching process pasting together a plurality of partial images, analyzing the captured total image, and the like.

Hereafter, a description is given of a measurement using the above noted image measuring device 1.

Basic Image Measurement

First, the stage 100 is displaced such that the work piece W enters within an image capture field of view by the operation of the joystick 132 performed by the operator or the control by the computer system 140. The position in the Z axis direction of the image capture unit 120 is adjusted such that the work piece W is in focus. After the work piece W is in focus, a measurement image is captured by the image capturer 124. At this time, the captured image and the coordinates of the stage 100 output by the X axis encoder 112 and the Y axis encoder 114 are imported to the computer system 140, and stored in the memory 41. Specifically, at the point in time when the image capturer 124 ends capturing the single image, a pulse which is the trigger signal to the latch portion 118 is output. The latch portion 118 latches and holds the position coordinates of each axis at the point in time when the pulse rises and transmits (in other words, at almost the same time when image capture ends). The computer system 140 imports the image signal from the image capturer 124 and the position coordinates when the image is captured from the latch portion 118, associated the image signal with the position coordinates, and stores both.

Figure 5:
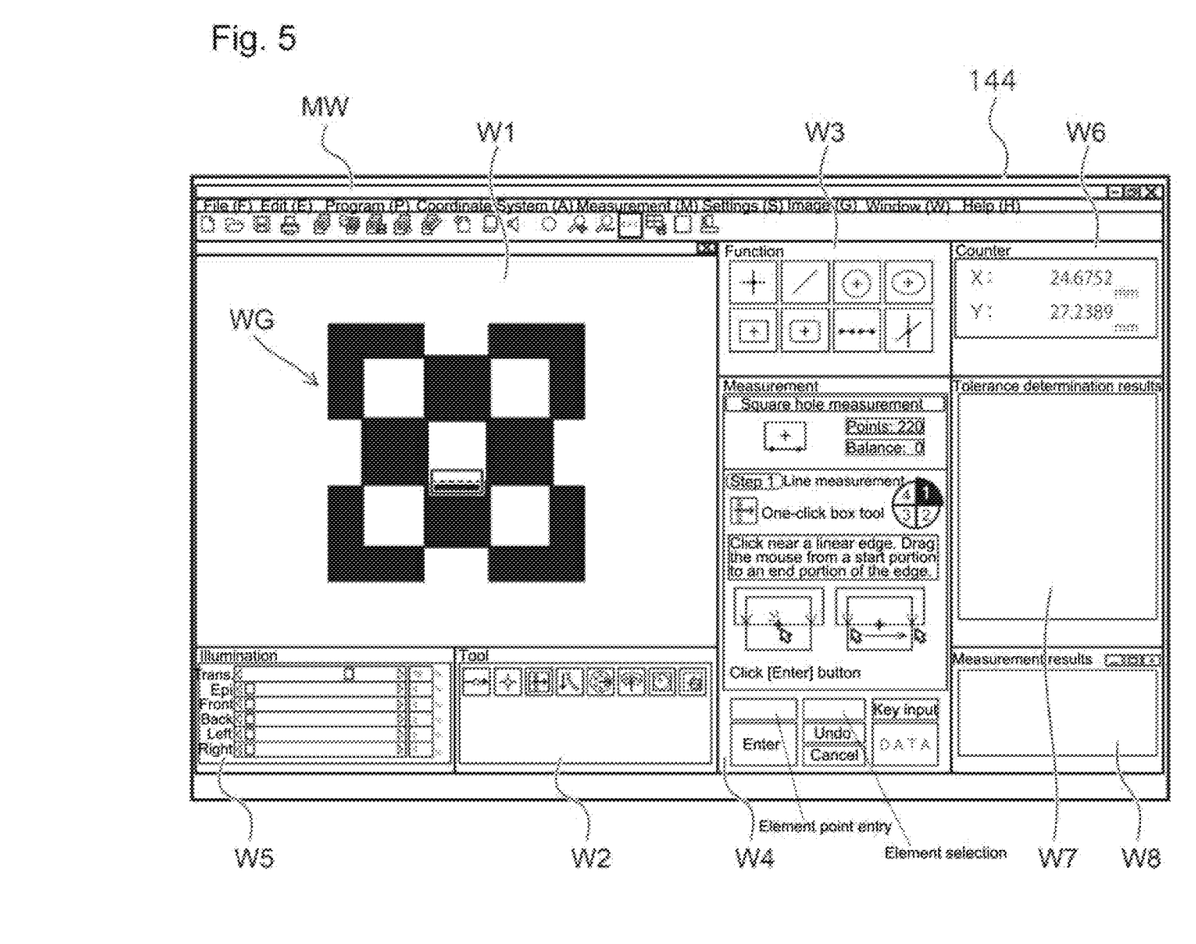
FIG. 5 illustrates an exemplary screen display.

The computer system 140 displays in the display 144 the captured measurement image with the measurement tool interface for analyzing the image. FIG. 5 illustrates an exemplary screen display. The screen display is rendered in the display 144 by a program (measurement application software) executed by the CPU 40 of the computer system 140.

As shown in FIG. 5, a main window MW is displayed in the display 144 by executing the program. In addition, a plurality of windows (first window W1 through eighth window W8) are displayed in the main window MW. A menu and icons for various operations and settings are also displayed on an upper portion of the main window MW. The present embodiment shows an example where eight windows are displayed; however, a display of other than eight windows may be provided as needed and may be omitted according to a division, integration, and use of the windows. In addition, a layout of each window can be freely changed through an operation from the operator.

In the first window W1, an image WG of the work piece W imported by the image capture unit 120 is displayed. The operator can adjust a position of the image WG of the work piece W displayed in the first window W1 by operating the mouse 143 or the joystick 132 of the remote box 130, for example. The operator can also zoom in and zoom out in the image WG of the work piece W by selecting the icon using the mouse 143, for example.

In the second window W2, tool icons for measurement from which the operator can select are displayed. The tool icons for measurement are provided corresponding to methods for designating a measurement point on the image WG of the work piece W. Specific examples of the measurement tools are a straight line edge detection tool, a circle edge detection tool, and the like.

In the third window W3, function icons from which the operator can select are displayed. A function icon is provided for each measurement method. Examples include a method measuring coordinates of one point; a method measuring a length of a straight line; a method measuring a circle; a method measuring an ellipse; a method measuring a square hole; a method measuring an elongated hole; a method measuring a pitch; and a method measuring an intersection of two lines. The computer system 140 follows the selection made by the operator and measures a length of the straight line, distance between the straight lines, a size of a diameter of the circle and the like, and performs an evaluation of an offset (deviation) from ideal geometric shapes such as straightness, roundness, parallelism, and the like.

The fourth window W4 displays guidance indicating an operation sequence related to the measurement.

The fifth window W5 displays various sliders controlling illumination striking the work piece W from the image capture unit 120. The operator can provide the desired illumination to the work piece W by operating the sliders.

The sixth window W6 displays XY coordinate values of the stage 100. The XY coordinate values displayed in the sixth window W6 are the coordinates in the X axis direction and the coordinates in the Y axis direction of the stage 100 relative to a predetermined origin point.

The seventh window W7 displays tolerance determination results. In other words, in a case where a measurement method capable of performing a tolerance determination is selected, the seventh window W7 displays those results.

The eighth window W8 displays the measurement results. In other words, in a case where a measurement method obtaining measurement results using a predetermined calculation is selected, the eighth window W8 displays those results. Detailed depictions of the tolerance determination results display in the seventh window W7 and the measurement results display in the eighth window W8 are omitted from the drawings.

Preparation for Capturing Partial Image for Image Stitching

When measuring a measurement range broader than the image capture range of a first pass by the image capturer 124, capturing the partial image is repeated to cover the entire measurement range with a plurality of partial images by sequentially displacing the stage 100 in the X and Y axis directions and by displacing the image capturer 124 (the image capture unit 120) relative to the work piece W. The single total image covering the entire measurement range is formed by pasting together the plurality of the partial images obtained in this way. Hereafter, for comparison, an exemplary case is described where a work piece W, similar in size to the work piece W (see FIGS. 7B and 7C) imaged in the background art, is captured using the method according to the present invention. The size of the work piece W is not limited to this.

Figures 6A, 6B:
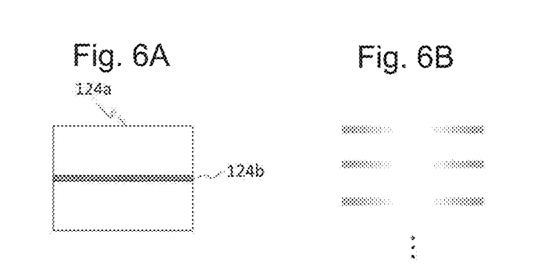
FIGS. 6A to 6D are drawings describing a method of setting an image capture region and an image capture method of a partial image.

Before image capture, as shown in FIG. 6A, an image capture region 124*a* of the image capturer 124 is defined so as to capture an image of only a linear region 124*b* which is a portion of the image capture region 124*a*. More specifically, the image capture region 124*a*, which is an area sensor, is defined so as to be available for use as a line sensor by the ROI setting. In other words, the image capturer 124 of the present invention needs to be capable of setting the ROI. In general, a CMOS image sensor is suitable. The linear region 124*b* is defined such that a short direction of the linear region 124*b* matches a relative displacement direction between the work piece W and the image capturer 124. For example, a program may be configured such that the setting is performed in a series of screen displays rendered in the display 144, shown in FIG. 5, by the program (measurement application software) executed by the CPU 40 of the computer system 140. When the image stitching is necessary, the program may be defined so as to be available for use as the line sensor. When the image stitching is not required, there may be a case where image capturing without narrowing down the image capture region is more efficient. Therefore, the program may be configured to be easily switchable so as to be available for use as the area sensor by releasing the setting.

By narrowing the image capture region down to a partial region within the image capture region, an information amount of the single image can be reduced, thereby increasing the frame rate. For example, when the image capture region 124*a* is defined at 2048×1536 pixels with a clock frequency for transferring the image at 48 MHz, the frame rate is 12 fps. When the linear region 124*b* is narrowed down to 2048×2 pixels, the maximum frame rate is 729 fps. By increasing the frame rate in this way, a plurality of partial images can be captured continuously without gaps while shifting the image capturing position. In particular, when the partial region is configured in the line shape such as the line sensor to perform image capture, the non-uniformity in brightness of the captured image and the distortion in the lens are generated in the length direction of the linear region 124*b* in the same way as in the conventional method. However, when a width of the linear region 124*b* in the short direction is sufficiently thin, the non-uniformity in brightness of the captured image and the distortion in the lens are hardly generated. For example, when the image capture region 124*a* is defined at 2048×1536 pixels, the linear region 124*b* is preferred to be defined at 2048×2 pixels.

By capturing images of the work piece W continuously without gaps while displacing the image capturer 124, in which the image capture region is defined in this way, relative to the work piece W (stage 100) at the fixed speed (hereafter, referred to as a "scan"), a plurality of partial linear images are obtained as shown in FIG. 6B. For example, scanning speed may be set to about 600 lines/second, which is the speed of a general image scanner, but a configuration is preferred in which the scanning speed can be changed arbitrarily according to a desired measurement accuracy and measurement speed.

Figure 6C:
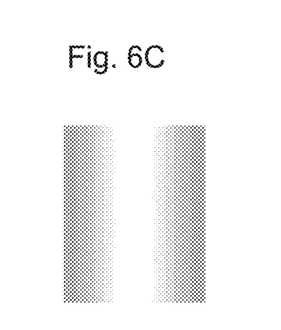

By pasting together the plurality of the captured partial linear images in a scanning direction, a highly accurate stitched image without offset or borders in the scanning direction can be obtained as shown in FIG. 6C. Such image capture and stitching of partial images can be performed within a range where the image capturer 124 is displaceable relative to the stage 100.

Figure 6D:
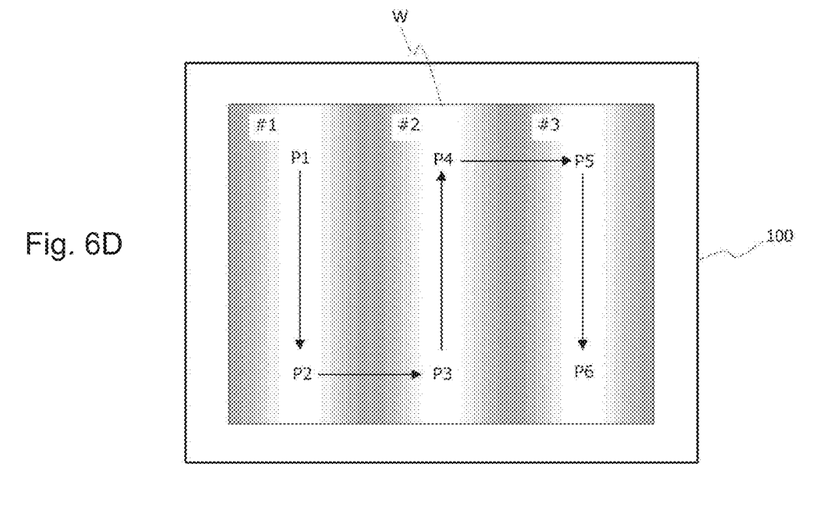

Conventionally, as shown in FIGS. 7B and 7C, the partial image of each region aligned in a row (such as #1, #6, and #7) has non-uniform brightness and distortion, and therefore, offset and borders are generated in the pasted together portions. In the method according to the present invention, however, the partial linear image has no non-uniform brightness or distortion in the short direction, and thus the stitched image can be formed from the single region (#1) with hardly any border or offset as shown in FIG. 6D. In a case where the non-uniform brightness and the distortion are seen in the partial image, it is possible to reduce the occurrence of borders and offset by correcting each of the partial images when pasted together; however, correcting without error is difficult. Therefore, eliminating the non-uniform brightness and the distortion in the lens provides a remarkable effect on improving the accuracy of the stitched image. In addition, in the conventional method, an overlap margin has been required to correct the border and offset between each region, such as between #1 and #6 and between #6 and #7, and therefore a wasted area is generated in the captured image. However, in the method according to the present invention, no overlap margin is required and therefore, the area for capturing image can be minimized, increasing image capture efficiency.

When the width of the linear region 124*b* in the length direction is narrower than the width of the work piece W, as shown in FIG. 6D, the entire work piece W can be scanned efficiently by sliding sideways after scanning the region in the first row and repeating an operation of scanning a region in an adjacent row in a reverse direction.

As evident from the above description, in the conventional image capture method, the lattice borders or offset are generated when a plurality of partial images are pasted together as shown in FIGS. 7B and 7C; however, according to the image capture method according to the present invention, only stripe-like borders and offset are generated as shown in FIG. 6D. Therefore, compared to the conventional method, the image stitching can be performed with high accuracy.

In addition, in the present invention, the partial image is captured while scanning the work piece W at the fixed speed without stopping the image capturer 124, and therefore, time to capture the image can be shortened and the reduction of pasting accuracy due to the unstable behavior of the device can be prevented.

Further, the light source 126 is sufficient when capable of emitting enough light at a portion of the work piece W where the linear region 124b is captured and the device cost can be reduced because a high-intensity light source capable of illuminating a broad area is not required.

The exposure time of the image capturer 124 needs to be defined depending on the scanning speed. For example, when the scanning speed is set at 600 lines/second, the exposure time is preferred to be about 1/600 seconds or 1/300 seconds. When the exposure time is properly defined in this way, in cases where the light intensity of the light source 126 is constantly fixed, the light intensity may not be sufficient in a case where the exposure time is short. A configuration may be provided so as to properly control the light intensity based on the exposure time.

Capturing Partial Image for Image Stitching

When measurement is necessary for a measurement range wider than the image capture range of a first pass, the computer system 140, automatically or by following an operation from the operator, determines a plurality of measurement regions for image capturing the measurement range required by the image stitching. The measurement region in this example is the range where scanning is performed continuously. For example, in the work piece W shown in FIG. 6D, three measurement regions (#1, #2, and #3) are determined. The plurality of measurement regions may be determined such that about 5% of the field of view in each of the image capturing positions overlaps with the field of view in the adjacent measurement region. In addition, in order to set the time for capturing a plurality of images to the minimum, a displacement path of the image capture unit 120 relative to the work piece W is determined. For example, when the regions are configured as in FIG. 6D, the displacement path indicated by arrows is preferred.

In a state where the image capture unit 120 is fixed, a plurality of partial images are captured while repeating displacements and pauses of the stage 100 along the predetermined displacement path following the control by the computer system 140. In the example shown in FIG. 6D, while displacing the center position of the image capture field of view of the image capturer 124 from P1 to P2, a plurality of partial images are captured continuously without gaps (image capture of the measurement region #1). When the center position reaches P2, the center position makes a stop, and then is displaced to P3. Next, while displacing from P3 to P4, a plurality of partial images are captured continuously without gaps (image capture of the measurement region #2). When the center position reaches P4, the center position makes a stop, and then is displaced to P5. Next, while displacing from P5 to P6, a plurality of partial images are captured continuously without gaps (image capture of the measurement region #3). Each of the captured partial images is imported one by one to the computer system 140 and stored in the memory 41. In the image data imported to the computer system 140, numbers are given according to the image capture order and therefore, the order in which the images are captured can be identified. The plurality of partial images imported in this process are original images for image stitching.

In the latch portion 118, the count value of the counter 118a is reset before starting the image capture of the partial images for image stitching. At the point in time when image capture at the image capture position for each partial image ends, based on the trigger signal provided from the image capture unit 120, position coordinates of each axis are stored at the address corresponding to the measurement position. The stored position coordinates of each measurement position are imported to the computer system 140 and are stored in the memory 41 in association with each separately imported partial image.

Image Stitching Process

The computer system 140 performs the image stitching process by pasting together the plurality of partial images captured as described above to form the single total image covering the entire measurement range.

The computer system 140, before pasting together the images, makes corrections to each of the partial images to inhibit degradation in the stitched image. Examples include interpolation of distortion in the image generated by an optical system characteristic, interpolation of offset of the pixel position between adjacent measurement regions, a shading process reducing the difference in brightness between adjacent portions, and the like. However, in the present invention, the captured partial image is in the linear shape and non-uniformity in brightness or distortion in the lens are hardly generated in the short direction of the image, and therefore, performing corrections in the length direction of the image is sufficient. In the present invention, by using a method in which the partial images are captured one by one, slight offset in the exposure time stamp and the reading time of the linear region 124b occurs for every image capture. For this reason, based on the offset between each of the captured partial images, a slight distortion may be generated in the stitched image, and therefore, correction is performed for this distortion as needed.

In the interpolation of the distortion, the computer system 140 uses a distortion correction parameter obtained by a calibration ahead of time to perform a pixel interpolation process so as to cancel out the distortion for each of the partial images according to the position of the partial image inside the image.

The offset of the pixel position between the adjacent measurement regions is caused because the region size within the field of view corresponding to one pixel is different from a displacement pitch of the stage 100. In a case where a visual field of 24 mm in length and 32 mm in width is captured in the image capture region 124a having 2048×1536 pixels, for example, the region (pixel size) within the field of view corresponding to one pixel is a square having one side of about 16 μm. Meanwhile, displacement of the stage 100 generally does not match with the length of one side of the portion corresponding to one pixel. Therefore, in the partial image captured at a certain measurement position, the portion included within one pixel may extend over a plurality of pixels in the partial image captured in the adjacent measurement region. In a case where offset is seen in the pixel position between the adjacent measurement regions, when pixels are simply pasted together, the error in the borders between pasted portions becomes large and degrades image quality after composition. Therefore, based on the image capture position and the pixel size of each partial image, the computer system 140 performs a pixel supplement process for each of the partial images and makes corrections such that the pixel positions match.

In the shading process, the computer system 140 reduces difference in brightness around the boundaries of pasted portions of the partial images of the adjacent measurement regions using the shading process for each of the partial images. Accordingly, the non-uniformity in brightness within the pasted image obtained by the image stitching process is reduced.

By making corrections to the each of the partial images as noted above, degradation of the image quality of the pasted images after image stitching can be inhibited.

Next, the computer system 140 forms the total image by pasting together the corrected partial images respectively based on the image capture position when each of the partial images stored in the latch portion 118 was captured. The pixel value of the overlapped portion between the partial images of the adjacent measurement regions uses the value of one of the partial images. As a second method, the pixel value of the overlapped portion may be an average value between the partial images of the adjacent measurement regions. The image data of the total image associated with a set of images of the partial images and the image capture information (such as the position, exposure time, focus, correction data of a distortion parameter, and the like) at the point in time when the respective partial image is captured, and is stored in the memory 41. The image data of the total image is used for displaying a preview image in the display, application commands of the measurement tools, an image for a report, and the like.

Measurement and Analysis after Image Stitching Process

The computer system 140 displays the total image pasted together by the image stitching process as the work piece image WG in the first window W1 in the display 144. The computer system 140 receives an operation from the operator and performs the measurement corresponding to the operation.

Modification

The present invention is not limited to the above-described embodiment, and includes modifications and improvements within a scope capable of achieving the advantages of the present invention.

For example, the above-noted embodiment is an example of the two-dimensional image measuring device; however, the present invention is also applicable to a three-dimensional image measuring device or other types of image measuring device.

Further, illumination for the work piece W is not limited to epi-illumination and transillumination, and may be ring illumination for example.

Furthermore, the present invention may be configured such that the stage 100 is fixated and the image capture unit 120 is displaced in the XY direction since any relative displacement between the work piece W and the image capture unit 120 is sufficient. In this case, the position acquirer reads the position coordinates in the XY direction from the image capture unit 120.

In addition, a display format, displayed items, or the like for each window displayed in the exemplary display screen are not limited to those described above.

In addition, in the above-noted embodiment, the measurement using the image stitching process being executed by an operation by the operator is described as an example, however, the measurement may be performed following a program (parts program) defined with a prearranged measurement sequence.

In addition, the nature of the measurement is, of course, not limited to the descriptions included in the present embodiment. For example, the present invention can be applied to various measurements such as an automatic tracing, pattern detection, one-click measurement, and the like in addition to edge detection.

With respect to the above-described embodiment or specific examples, a person skilled in the art can perform suitable addition, deletion, and design modification of configuration elements, and such modifications are also included in the scope of the present invention as long as they include the substance of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An image measuring device comprising:
   an image sensor configured to capture an image on a generally rectangular image capture region of the image sensor, of a measurable object;
   a motor configured to relatively displace the object and the image sensor;
   a processor and a memory that stores an instruction, wherein upon execution of the instruction, the processor operates as:
      a position acquirer configured to acquire a position where the image is captured by the image sensor;
      a controller configured to control the image sensor to capture partial images of the object while displacing the image sensor relative to the object at a fixed speed using the motor; and
      a total image former configured to form a total image of the object by pasting together a plurality of partial images captured by the image sensor based on position data acquired by the position acquirer; and
   a light source integrally displaceable with the image sensor relative to the object, the light further configured to emit light at a portion of the object captured by the image sensor,
   wherein:
      the image sensor is set so as to capture a plurality of only linear regions, each linear region of the plurality of linear regions being a portion of the image capture region and representing a partial image of the object, a width direction of the linear regions match a relative displacement direction between the object and the image sensor, and the controller controls the image sensor to capture a plurality of the partial images of the object sequentially without overlap of the partial images in the width direction.

2. The image measuring device according to claim 1, wherein settings of the image sensor are switchable so as to capture an image of the entire image capture region.

3. The image measuring device according to claim 2, wherein:

the image sensor is configured to output the partial captured image with an index indicating an image capture order, and is further configured to output a trigger signal when image capture is completed, and the position acquirer comprises:

an encoder configured to measure and output position coordinates of one of the stage where the object is placed and of the image sensor, and a latch configured to obtain the position coordinates outputted by the encoder when the trigger signal is input, the latch further configured to store in a memory region the obtained position coordinates with a count value indicating the image capture order, the total image former is further configured to identify the position of respective partial images to form the total image by associating the partial image and the position coordinates having the same image capture order.

4. The image measuring device according to claim 3, wherein the controller is further configured to change a relative displacement speed between the object and the image sensor.

5. The image measuring device according to claim 4, wherein the controller is further configured to adjust light intensity of the light based on the relative displacement speed between the object and the image sensor.

6. The image measuring device according to claim 3, wherein the controller is further configured to adjust light intensity of the light based on the relative displacement speed between the object and the image sensor.

7. The image measuring device according to claim 2, wherein the controller is further configured to change a relative displacement speed between the object and the image sensor.

8. The image measuring device according to claim 7, wherein the controller is further configured to adjust light intensity of the light based on the relative displacement speed between the object and the image sensor.

9. The image measuring device according to claim 2, wherein the controller is further configured to adjust light intensity of the light based on the relative displacement speed between the object and the image sensor.

10. The image measuring device according to claim 1, wherein:

the image sensor is configured to output the partial captured image with an index indicating an image capture order, and is further configured to output a trigger signal when image capture is completed, and the position acquirer comprises:

an encoder configured to measure and output position coordinates of one of the stage where the object is placed and of the image sensor, and a latch configured to obtain the position coordinates outputted by the encoder when the trigger signal is input, the latch further configured to store in a memory region the obtained position coordinates with a count value indicating the image capture order, the total image former is further configured to identify the position of respective partial images to form the total image by associating the partial image and the position coordinates having the same image capture order.

11. The image measuring device according to claim 10, wherein the controller is further configured to change a relative displacement speed between the object and the image sensor.

12. The image measuring device according to claim 11, wherein the controller is further configured to adjust light intensity of the light based on the relative displacement speed between the object and the image sensor.

13. The image measuring device according to claim 10, wherein the controller is further configured to adjust light intensity of the light based on the relative displacement speed between the object and the image sensor.

14. The image measuring device according to claim 1, wherein the controller is further configured to change a relative displacement speed between the object and the image sensor.

15. The image measuring device according to claim 14, wherein the controller is further configured to adjust light intensity of the light based on the relative displacement speed between the object and the image sensor.

16. The image measuring device according to claim 1, wherein the controller is further configured to adjust light intensity of the light based on the relative displacement speed between the object and the image sensor.

17. At least one tangible, one non-transitory computer-readable medium storing an executable set of instructions for measuring an image which, when executed by a computer processor, causes the processor to execute operations comprising:

capturing, by an image sensor, an image of a measurable object on a generally rectangular image capture region of the image sensor;

relatively displacing the object and the image sensor;

acquiring a position where the image is captured by the image sensor;

controlling, by the processor, the image sensor to capture partial images of the object while displacing the image sensor relative to the object at a fixed speed;

forming, by the processor, a total image of the object by pasting together a plurality of partial images captured by the image sensor based on the acquired position data;

integrally displacing a light with the image sensor relative to the object;

emitting, from the light, light at a portion of the object captured by the image sensor, setting the image sensor so as to capture a plurality of only linear regions, each linear region of the plurality of linear regions being a portion of the image capture region and representing a partial image of the object, wherein a width direction of the linear regions match a relative displacement direction between the object and the image sensor, and controlling, by the processor, the image sensor to capture a plurality of the partial images of the object sequentially without overlap of the partial images in the width direction.

* * * * *

UNITED STATES PATENT AND TRADEMARK OFFICE
CERTIFICATE OF CORRECTION

PATENT NO. : 10,475,202 B2
APPLICATION NO. : 15/423941
DATED : November 12, 2019
INVENTOR(S) : Yoshida Page 1 of 1

It is certified that error appears in the above-identified patent and that said Letters Patent is hereby corrected as shown below:

In the Claims

At Column 14, Line 57 (Claim 1, Line 20), please delete "source" before "integrally".

Signed and Sealed this
Ninth Day of June, 2020

Andrei Iancu
*Director of the United States Patent and Trademark Office*